United States Patent
Malay

(10) Patent No.: US 11,364,708 B2
(45) Date of Patent: Jun. 21, 2022

(54) DIELECTRIC THIN FILM COATINGS FOR UNIDIRECTIONAL AND BIDIRECTIONAL WAVELENGTH SELECTIVE REFLECTIVE COLOR GENERATION

(71) Applicant: VDI LLC, Okolona, KY (US)

(72) Inventor: Robert Malay, Woburn, MA (US)

(73) Assignee: VDI LLC, Okolona, KY (US)

( * ) Notice: Subject to any disclaimer, the term of this patent is extended or adjusted under 35 U.S.C. 154(b) by 28 days.

(21) Appl. No.: 16/923,215

(22) Filed: Jul. 8, 2020

(65) Prior Publication Data

US 2021/0008845 A1    Jan. 14, 2021

Related U.S. Application Data

(60) Provisional application No. 62/871,240, filed on Jul. 8, 2019.

(51) Int. Cl.
*B32B 27/02* (2006.01)
*B32B 17/10* (2006.01)
*B32B 27/36* (2006.01)

(52) U.S. Cl.
CPC ...... *B32B 17/10201* (2013.01); *B32B 27/365* (2013.01); *B32B 17/10752* (2013.01); *B32B 2367/00* (2013.01); *B32B 2369/00* (2013.01)

(58) Field of Classification Search
CPC .............. B32B 17/10; B32B 17/10201; B32B 17/10752; B32B 2307/416; B32B 2367/00; B32B 2369/00; B32B 2605/00; B32B 27/365
See application file for complete search history.

(56) References Cited

U.S. PATENT DOCUMENTS

| | | | |
|---|---|---|---|
| 4,185,894 A | 1/1980 | Hilton et al. | |
| 4,622,620 A | 11/1986 | Michel | |
| 4,985,321 A * | 1/1991 | Chou | G03G 9/12 430/117.4 |
| 5,877,895 A | 3/1999 | Shaw et al. | |

(Continued)

FOREIGN PATENT DOCUMENTS

| | | |
|---|---|---|
| DE | 19638708 A1 | 4/1998 |
| DE | 19746067 A1 | 4/1999 |

(Continued)

OTHER PUBLICATIONS

Langton et al. "The Dielectric Constant of Zinc Oxide Over a Range of Frequencies." British Journal of Applied Physics, 1958, vol. 9, No. 11, Abstract.

*Primary Examiner* — Lawrence D Ferguson
(74) *Attorney, Agent, or Firm* — Michael E. Dockins; Shumaker, Loop & Kendrick, LLP

(57) ABSTRACT

Multilayer films including thin film coating structures are provided that generate colors through certain reflective mechanisms. Both opaque and transparent applications are demonstrated. A coating of a thin metal layer provides a reflective surface on which one or more colors are generated, where the metal layer can control a general level of transparency of the overall multilayer film. Inclusion of one or more dielectric layers, adjustment of thicknesses thereof, and the number and order in which such dielectric layers appear in the multilayer film can be tailored to generate unique colors with unique properties.

17 Claims, 11 Drawing Sheets
(5 of 11 Drawing Sheet(s) Filed in Color)

(56) References Cited

U.S. PATENT DOCUMENTS

| | | |
|---|---|---|
| 5,962,115 A | 10/1999 | Zmelty et al. |
| 6,132,873 A | 10/2000 | Dietz et al. |
| 6,236,510 B1 | 5/2001 | Bradley, Jr. et al. |
| 6,569,529 B1 | 5/2003 | Phillips et al. |
| 7,106,516 B2 | 9/2006 | Lotz et al. |
| 7,239,464 B2 | 7/2007 | Okami et al. |
| 9,558,888 B2 | 1/2017 | Baer et al. |
| 2003/0207529 A1 | 11/2003 | Lim et al. |
| 2010/0279566 A1 | 11/2010 | Fang et al. |
| 2015/0064480 A1 | 3/2015 | Imran et al. |

FOREIGN PATENT DOCUMENTS

| | | |
|---|---|---|
| DE | 10137831 A1 | 2/2003 |
| EP | 1587881 B2 | 10/2005 |
| JP | 398304 B2 | 10/2007 |

\* cited by examiner

DIELECTRIC THIN FILM COATINGS FOR UNIDIRECTIONAL AND BIDIRECTIONAL WAVELENGTH SELECTIVE REFLECTIVE COLOR GENERATION

CROSS-REFERENCE TO RELATED APPLICATIONS

This application claims the benefit of U.S. Provisional Application No. 62/871,240, filed on Jul. 8, 2019. The entire disclosure of the above application is incorporated herein by reference.

FIELD

The present technology relates to multilayer films providing reflective color generation, including multilayer films having certain layers of metals and dielectrics that exhibit particular color shifts dependent on observer angle.

INTRODUCTION

This section provides background information related to the present disclosure which is not necessarily prior art.

There have been a variety of methods to generate color on polymer films. Many involve the dying of the film itself using an organic or inorganic pigments and dyes, or surface coating. However, this often uses a costly material that is not environmentally friendly, and whose color fades over time, especially with exposure to sunlight.

Wavelength selective reflection has been demonstrated primarily on rigid substrates. For example, U.S. Pat. No. 4,185,894A describes the use of a dielectric stack with tunable colors dependent on film thickness for use in liquid crystal display panels. In this case, the reflective stacks serve as an electrode for transmitting the desired color.

U.S. Pat. No. 6,236,510B1 describes a dielectric stack deposited onto a release liner that is coated onto a polymer web. The thin film is then removed from the polymer web, and ground into pigments of varying color, depending on the thickness and composition of the dielectric.

U.S. Pat. No. 5,877,895A describes a multicolored interference coating using the same technique. A dielectric stack with a metal interference layer on either side generates a color that is dependent on the thickness and composition of the dielectric.

SUMMARY

The present technology includes articles of manufacture, systems, and processes that relate to wavelength selective reflection to generate one or more colored effects for use in window film laminations, including various multilayer metal and dielectric stack structures that generate various colors, such structures including a polymer web base layer, a thin film metal coating, and at least one dielectric layer. Multilayer films provided herein can reflect a color from one observer angle, while maintaining a neutral tint from another observer angle. Multilayer films provided herein can also be configured in various sandwiched film structures to reflect the same, similar, or different colors from different observer angles.

Multilayer films and ways of constructing and using such films include provision of a base layer, a metal layer, and a first dielectric layer. The base layer can have a thickness from about 12 micrometers to about 2 millimeters, the metal layer can have a thickness from about 5 nm to about 10 micrometers, and the first dielectric layer can have a thickness from about 5 nm to about 10 micrometers. The metal layer can be configured to reflect visible light. Tuning of compositions of the various layers, respective thicknesses thereof, providing additional dielectric layers (e.g., second, third, fourth, etc. dielectric layers), and the ordering and juxtaposition of the various layers relative to each other can provide selective reflective color generation at certain observer angles. Various methods can be employed to construct such multilayer films, including various physical and/or chemical depositions techniques. In this way, the multilayer films can be applied to various surfaces, such as windows of vehicles or buildings, to provide special optical effects and well as reflect visible light at certain angles for tinting and cooling effects.

Further areas of applicability will become apparent from the description provided herein. The description and specific examples in this summary are intended for purposes of illustration only and are not intended to limit the scope of the present disclosure.

DRAWINGS

The patent or application file contains at least one drawing executed in color. Copies of this patent or patent application publication with color drawing(s) will be provided by the Office upon request and payment of the necessary fee.

The drawings described herein are for illustrative purposes only of selected embodiments and not all possible implementations, and are not intended to limit the scope of the present disclosure.

FIG. 1 is a cross sectional view of a unidirectional multilayer film structure that includes a base polymer web, a coating of either opaque of transparent metal, and one or more dielectric thin films coated on top of the metal, where a total thickness of the multilayer film structure can vary depending on desired thicknesses of the individual layers and the selected number of the individual layers.

DETAILED DESCRIPTION

Figure 1:
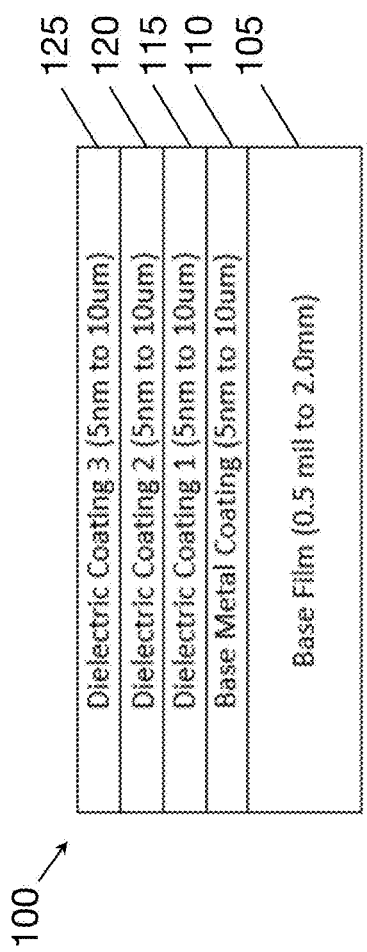

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology is drawn to various multilayer thin film stacks that are deposited onto a polymer film with the goal of reflective color generation, including selective reflective color based upon observer angle. More specifically, the present technology includes certain multilayer thin film stacks, ways of making such stacks, and coating techniques and processes related thereto. As provided herein, it is possible to obtain certain colors through such structures and processes, including the generation of favorable physical characteristics of the coating under different stresses, such as thermoformability, resistance to stress fractures, color differentials under elongation, etc. Particular uses of the multilayer thin film stacks include various applications to substrates, including lamination to various surfaces, where in certain instances one or more multilayer thin film stacks can be applied as window films.

Multilayer films are provide that include a base layer, a metal layer, and at least one dielectric layer; e.g., a first dielectric layer. The base layer has a thickness from about 12 micrometers to about 2 millimeters. The metal layer has a thickness from about 5 nm to about 10 micrometers and is configured to reflect visible light. The first dielectric layer has a thickness from about 5 nm to about 10 micrometers. Additional dielectric layers can likewise independently have thicknesses ranging from about 5 nm to about 10 micrometers.

The base layer can include the following aspects. In certain embodiments, the base layer includes an organic based substrate, such as a polyester, polyethylene terephthalate, polypropylene, polycarbonate, polyimide, polyamide, nylon, polyvinyl chloride, combinations of such organic based substrates, including blends thereof, as well as multilayer laminates of such organic based substrates. The base layer of the multilayer film can be applied to various substrates and surfaces, such as glass, plastic, as well as other films. A release layer can be applied to the base layer and/or to the outermost layer of the multilayer film structure opposite the base layer.

The metal layer can include the following aspects. The metal layer can be applied via one or more physical deposition processes and/or one or more chemical deposition processes. Such processes can be selectively applied to provide a layer of metal from about 5 nm to about 10 micrometers in thickness, where the layer surface can be uniformly structured to reflect visible light. Reflection of visible light can be achieved in various portions, where all or a portion of the visible light spectrum can be reflected by the metal layer. What is more, the amount of reflectance by the metal layer, or the percentage of the optical power reflected, can be varied such that in some embodiments less than half the incident visible light is reflected and in other embodiments more than half the incident visible light is reflected. In certain embodiments, the metal layer can have an optical density from about 0.2 to about 3.0. Physical and/or chemical deposition of the metal layer onto another layer (e.g., the base layer, dielectric layer) can result in the metal layer directly contacting the subject layer, where no intervening layer(s) and/or intervening materials are present therebetween. Such deposition processes can also allow the metal layer to directly contact a dielectric layer with the metal layer remaining substantially unoxidized thereby. For example, the metal layer can include a metal (e.g., titanium) and a dielectric layer can include an oxide of the metal (e.g., a titanium oxide), but the deposition process permits the metal layer to remain substantially unoxidized when applied to the oxide of the metal forming the dielectric layer. Examples of metals that can be applied as the metal layer include one or more of aluminum, titanium, chrome, stainless steel, silver, gold, copper, and, molybdenum.

The dielectric layer can include the following aspects. Individual dielectric layers used in the multilayer film can have a refractive index from about 1.5 to about 4. Using dielectric layers of certain refractive indices can alter the directional color generation of the multilayer film. Example dielectric layers can include one or more of titanium oxide, silicon oxide, aluminum oxide, titanium nitride, magnesium fluoride, zirconium oxide, and hafnium oxide. The multilayer film can include more than one dielectric layer; e.g., in addition a first dielectric layer, the multilayer film can include a second dielectric layer, a third dielectric layer, a fourth dielectric layer, and so on. Where more than one dielectric layer is present, embodiments include where the dielectric layers can be of the same composition but different thicknesses and where dielectric layers are of different compositions. For example, where the multilayer film includes a second dielectric layer, the first dielectric layer can be different than the second dielectric layer. Where the multilayer film includes the second dielectric layer, some embodiments include where the metal layer directly contacts the base layer, other embodiments include where the first dielectric layer and the second dielectric layer are interposed by the metal layer, and yet other embodiments include where the first dielectric layer directly contacts the second dielectric layer. Certain embodiments of the multilayer film further include a third dielectric layer, where the first dielectric layer and the third dielectric layer can be interposed by the second dielectric layer, the first dielectric layer and the third dielectric layer are formed of the same composition, and the first dielectric layer and the third dielectric layer have different thicknesses. Certain embodiments of the multilayer film further include a third dielectric layer, where the metal layer directly contacts the base layer, the first dielectric layer directly contacts the metal layer, the second dielectric layer directly contacts the first dielectric layer, and the third dielectric layer directly contacts the second dielectric layer. Certain embodiments of the multilayer film further include a fourth dielectric layer, where the first dielectric layer directly contacts the base layer, the second dielectric layer directly contacts the first dielectric layer, the metal layer directly contacts the second dielectric layer, the third dielectric layer directly contacts the metal layer, and the fourth dielectric layer directly contacts the third dielectric layer.

Particular constructs of the multilayer film can include a base layer, a metal layer, a first dielectric layer, a second dielectric layer, and a third dielectric layer. The base layer can have a thickness from about 12 micrometers to about 2 millimeters. The metal layer can have a thickness from about 5 nm to about 10 micrometers, where the metal layer can be configured to reflect visible light, can directly contact the base layer, and can have an optical density from about 0.2 to about 3.0. The first dielectric layer can have a thickness from about 5 nm to about 10 micrometers, can directly contact the metal layer, and can have a refractive index from about 1.5 to about 4. The second dielectric layer can have a thickness from about 5 nm to about 10 micrometers, can directly contact the first dielectric layer, and can have a refractive index from about 1.5 to about 4. The third dielectric layer can have a thickness from about 5 nm to about 10 micrometers, can directly contact the second dielectric layer, and can have a refractive index from about 1.5 to about 4. A schematic of an embodiment of such a multilayer film 100 is shown in FIG. 1, including a base layer 105, a metal layer 110, a first dielectric layer 115, a second dielectric layer 120, and a third dielectric layer 125.

Figure 2:
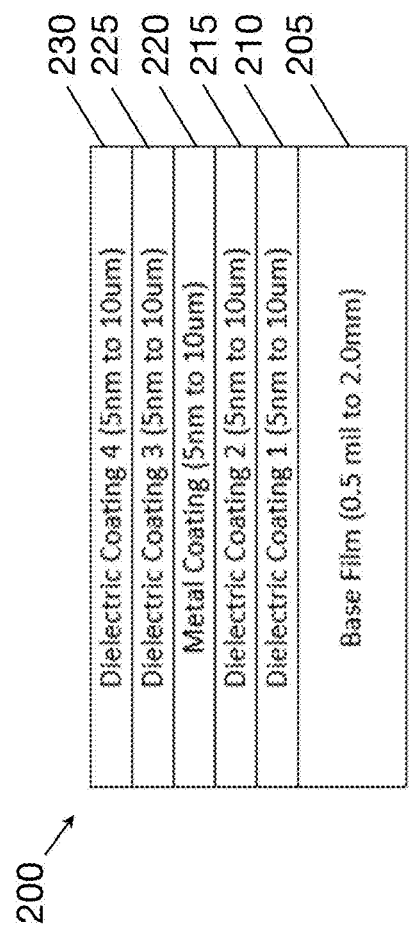
FIG. 2 is a cross sectional view of a bidirectional multilayer film structure, the layers separated and identified by type of layer and function inside a multilayer film structure, where a total thickness of the multilayer film structure can vary depending on desired thicknesses of the individual layers and the selected number of the individual layers.

Still further constructs of the multilayer film can include a base layer, a first dielectric layer, a second dielectric layer, a metal layer, a third dielectric layer, and a fourth dielectric layer. The base layer can have a thickness from about 12 micrometers to about 2 millimeters. The first dielectric can have a thickness from about 5 nm to about 10 micrometers, can directly contact the base layer, and can have a refractive index from about 1.5 to about 4. The second dielectric layer can have a thickness from about 5 nm to about 10 micrometers, can directly contact the first dielectric layer, and can have a refractive index from about 1.5 to about 4. The metal layer can have a thickness from about 5 nm to about 10 micrometers, where the metal layer can be configured to reflect visible light, can directly contact the second dielectric layer, and can have an optical density from about 0.2 to about 3.0. The third dielectric layer can have a thickness from about 5 nm to about 10 micrometers, can directly contact the metal layer, and can have a refractive index from about 1.5 to about 4. The fourth dielectric layer can have a thickness from about 5 nm to about 10 micrometers, can directly contact the third dielectric layer, and can have a refractive index from about 1.5 to about 4. A schematic of an embodiment of such a multilayer film 200 is shown in FIG. 2, including a base layer 205, a first dielectric layer 210, a second dielectric layer 215, a metal layer 220, a third dielectric layer 225, and a fourth dielectric layer 230.

Polymer webs used for the multilayer film include organic based substrates that are flexible in nature and capable of being processed via roll-to-roll manufacturing. Such organic based substrates include optically clear films such as various polyesters and biaxially oriented polypropylenes. However, dielectrics and metals can be incorporated into or coated onto various substrate films, including transparent, translucent, and tinted films that include, but are not limited to, polycarbonates, polyimides, polyamides, nylon, polyvinyl chloride, and polypropylenes.

The polymer web can serve as a base layer material onto which a variety of physical and chemical vapor deposition methods can be used to generate the multilayer film stack having selective reflective color. These deposition techniques are synonymous with past and current thin film deposition techniques and include technologies capable of finely tuned and controlled thin films of a given composition. For example, such deposition techniques can include use of one or more of: RF and DC magnetron sputter deposition, thermal evaporation, electron-beam evaporation, pulsed laser deposition, atomic layer deposition, molecular beam epitaxy, sol-gel deposition, electroplating, electroless deposition, low pressure chemical vapor deposition, and plasma enhanced chemical vapor deposition. These techniques can either be performed in a wafer-level or batch-level process, or as continuous roll-to-roll deposition techniques.

One or more of these deposition techniques can be used to sequentially coat a desired film stack onto the polymer web of the base layer. To generate a desired color, the primary coating that needs to be applied is the metallic layer. One or more of such metal layers can be applied that are either opaque, or partially transparent, with optical densities ranging from 0.2 to over 3.0. One requirement of the one or more metal layers is at least one metal layer has a relatively smooth surface and exhibits mirror-like properties in terms of reflection in the visible light spectrum.

The metal layer does not have to be the first coating to be put down. In certain iterations of the present technology, the metal layer can be sandwiched between two dielectric layers, such that the selective color generation can be obtained from both sides. In a similar manner, the metal layer can be opaque or transparent, so long as the surface of the metal layer is mirror-like and clearly reflects light in the visible spectrum.

A variety of metals can be used in the present technology, so long as the there is little to no oxide formation between the metal and any adjacent dielectric layers, as oxidation can interfere with the color generation mechanism. Metal thin films that can be used include one or more of: aluminum, titanium, chrome, stainless steel, silver, gold, copper, and molybdenum.

The next layers required for color generation are the dielectric layers. One or more dielectric layers can be provided on either side of the metal layer. Dielectric layers can have a wide variety of refractive indices, ranging from 1.5 to 4.0 and higher, for example. Dielectric thin films that can be used include one or more of: titanium oxide, silicon oxide, aluminum oxide, titanium nitride, magnesium fluoride, zirconium oxide, and hafnium oxide.

Figure 3:
FIG. 3 is a photograph of a demonstration multilayer film construct laminated to the inside of a vehicle window, where a reflective color seen from the outside is a light blue.
Figure 4:
FIG. 4 is a photograph of another demonstration multilayer film construct laminated to the inside of a vehicle window, where the reflective color seen from the outside is a faint orange.

The multilayer film stacks of the present technology can include the application and use of one or more dielectric layers in various orders and arrangements. Differing dielectric layers and varying thicknesses can allow for more complex color generation, such as angle dependent chroma shifts and adjustable hue textures. A single dielectric layer can allow for a single color at almost all angles. However, a series of three dielectric layers can allow for a color change as the angle of incidence changes. In this way, different effects and color reflectance can be achieved. FIG. 3 depicts a color photograph of a demonstration multilayer film construct laminated to the inside of a vehicle window, where a reflective color seen from the outside is a light blue. FIG. 4 depicts a color photograph of another demonstration multilayer film construct laminated to the inside of a vehicle window, where the reflective color seen from the outside is a faint orange.

Additional aspects of the present technology relate to multilayer films as described herein that exhibit certain properties. For example, the multilayer films can include layers of metals and dielectrics, either opaque or transparent in nature, that are applied to a base layer of polymer film that is free of cracking due to bending stresses, thermal stresses, or exposure to the environment. Such multilayer films can be unaffected by bending, moving, and stretching in their selective reflective color generation performance. Such multilayer films can also be added as a component in laminated stack of varying polymer substrates without losing color fastness. Certain applications include lamination of the multilayer film to automotive or architectural glass without a substantial change in ΔE (e.g., less than 1.5) and without a substantial change perceived color. Multilayer films can further include one or more release layers that can be separated from multilayer film, including release layers that can be dissolved in solution for removal. It is also possible to have the multilayer film deposited onto a release coated film in which, after removal, the aggregate color fastness of the coating remains intact and visible through the agglomeration of a solvent paste.

Various color generation effects are possible with the multilayer films. Embodiments include where color is generated from one side or observer angle and a neutral color is observed from the opposite side or a different observer angle. Further embodiments include where color is generated from one side of the multilayer film and a neutral color is observed through to the other side of the multilayer film. Still further embodiments include where color is generated from both sides of the multilayer film, and either side is tunable depending on the thickness of the layers on either side of a sandwiched metal layer. It is also possible to have color generated from both sides of the multilayer film, where either side is tunable depending on the thickness of the layers on either side of a sandwiched metal layer, and further include a release film or layer.

Example embodiments of the present technology are provided with reference to the examples and associated figures enclosed herewith.

Example 1

Figure 5:
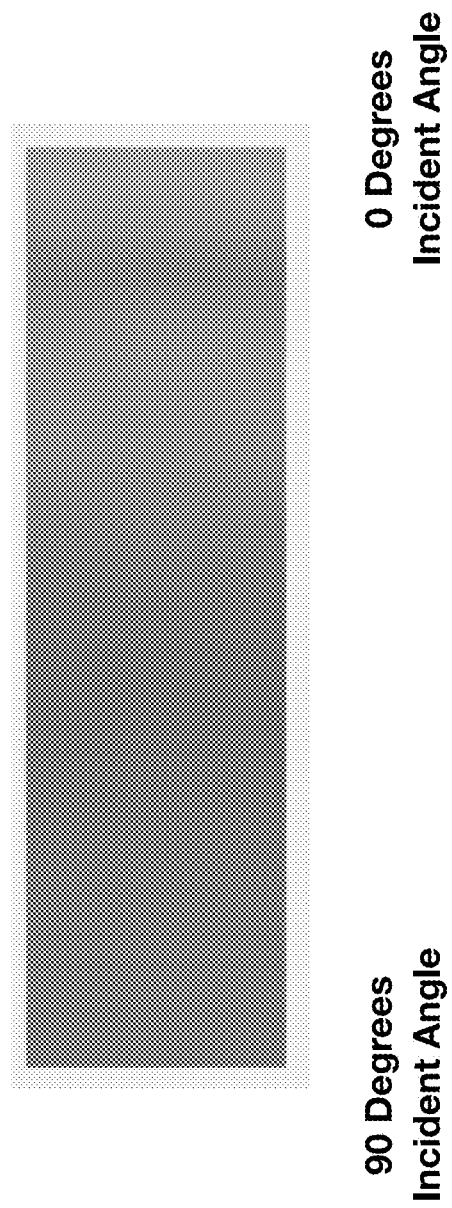
FIG. 5 depicts a model of the color shift of a 4-layer stack from 90 to 0 degrees of incident light, as provided by Example 1.
Figure 6:
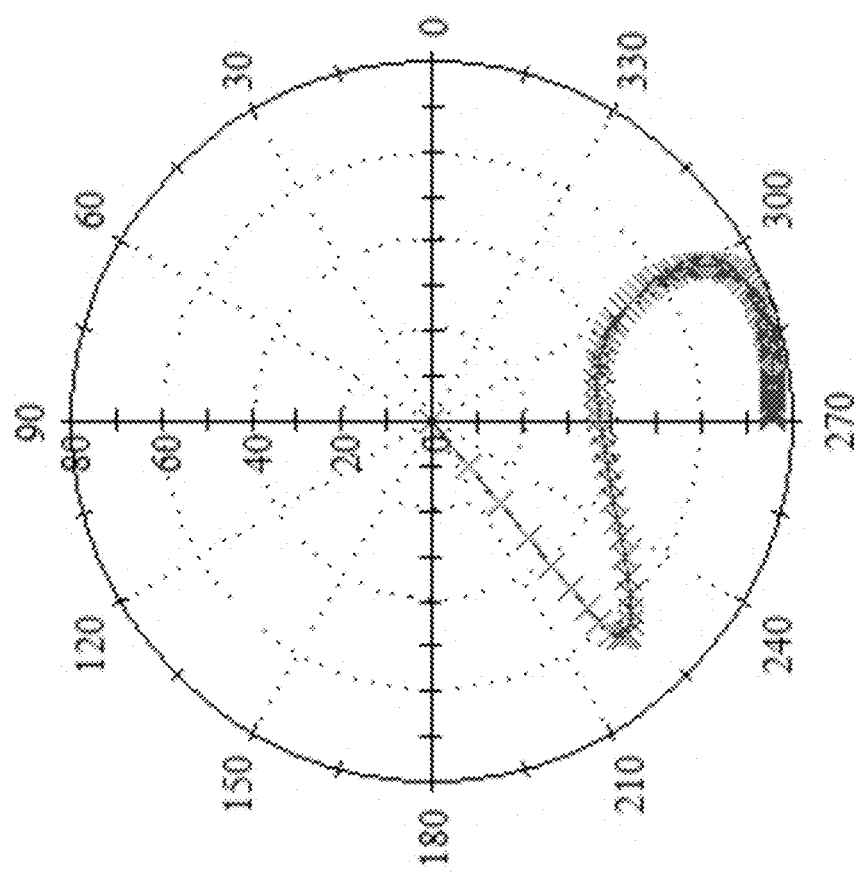
FIG. 6 depicts a plot of the related hue and chroma correlations at the different angles of observation, as provided by Example 1.

This example illustrates an opaque coating of metal, with three dielectric layers coated on top for color generation. FIG. 5 shows a model of the color shift of a multilayer film constructed as a 4-layer stack from 90 to 0 degrees of incident light, and FIG. 6 shows a plot of the related hue and chroma correlations at the different angles of observation, respectively.

The film stack that was used in the above charts is as follows, with the top-most layer being the first listed:
Titanium Oxide (dielectric layer)—30 nm
Silicon Oxide (dielectric layer)—85 nm
Titanium Oxide (dielectric layer)—58 nm
Titanium (metal layer)—100 nm
PET Film (base layer)—5 mil
The different thicknesses of the stack directly relate to the observed color that is reflected off the surface, even if the order and type of materials remain the same.

Example 2

Figure 7:
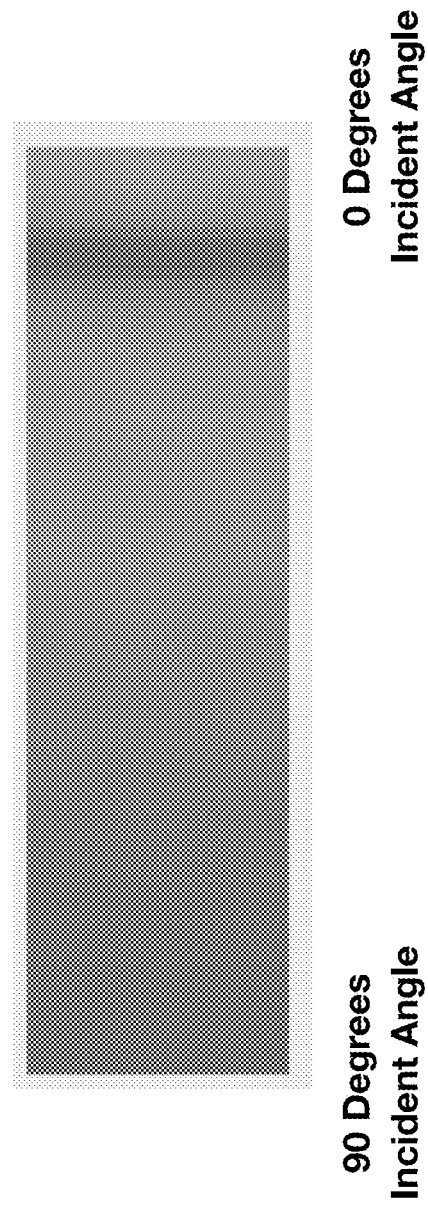
FIG. 7 depicts a model of the color shift of a 4-layer stack from 90 to 0 degrees of incident light, as provided by Example 2.
Figure 8:
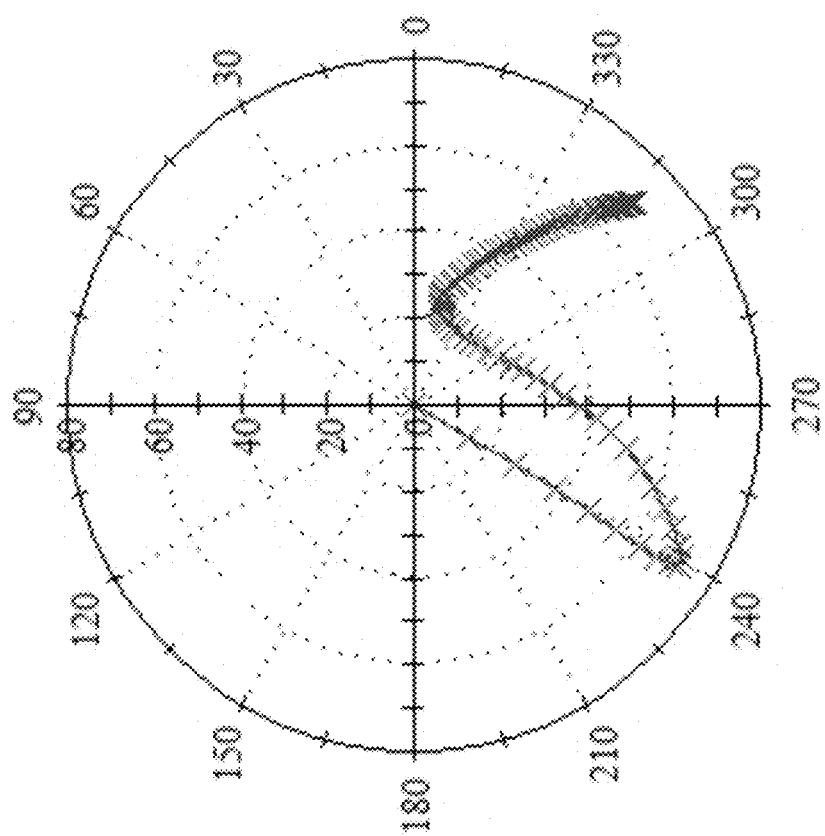
FIG. 8 depicts a plot of the related hue and chroma correlations at the different angles of observation, as provided by Example 2.
Figure 9:
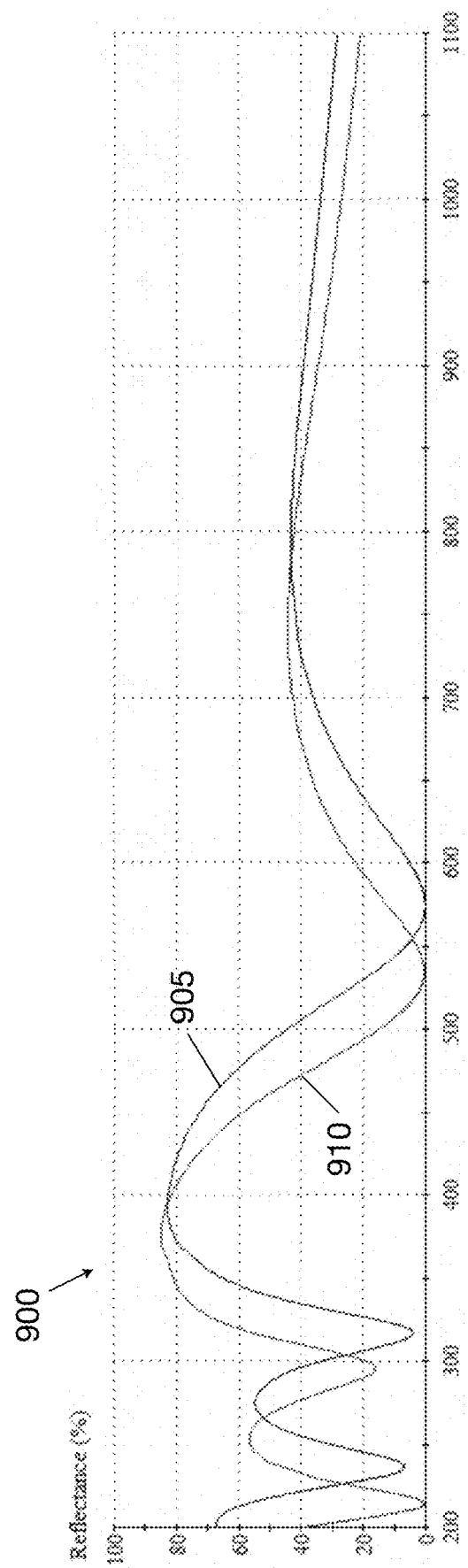
FIG. 9 depicts a reflectance spectral plot for the film stacks from Examples 1 and 2.

This example serves as a variant to Example 1. This is almost an identical multilayer film stack, with a very minor difference. As can be seen in FIGS. 7-9, changing one layer can result in a dramatic shift in color. FIGS. 7-8 are analogous charts to the previous multilayer film stack in Example 1, where FIG. 7 shows a model of the color shift of a multilayer film constructed as 4-layer stack from 90 to 0 degrees of incident light, and FIG. 8 shows a plot of the related hue and chroma correlations at the different angles of observation, respectively. However, for the stack of Example 2, the only difference is that the silicon oxide layer thickness has been decreased by 20 nm.
Titanium Oxide (dielectric layer)—30 nm
Silicon Oxide (dielectric layer)—65 nm
Titanium Oxide (dielectric layer)—58 nm
Titanium (metal layer)—100 nm
PET Film (base layer)—5 mil
As can be seen in the two-color simulations, there is a large difference the color generated, most noticeable at high angles of incidence. At 90-degree angle of observation, the first layer stack generates a blueish purple color, and transitions to pink/magenta at lower angles of incidence. The second layer stack, by contrast, shows a bright pink color at 90 degrees, and transitions to an orange color.

With reference now to FIG. 9, a reflectance spectral plot for the film stacks discussed in both examples 1 and 2 is shown at 900. Line 905 correlates to the multilayer film stack in Example 1, and line 910 correlates to the film stack in Example 2. The reflectance measurement is taken from the coated side at a 90 degree incident angle. From the plot, the reduction in silicon oxide thickness correlates to a leftward shift in the entire reflectance spectra, resulting in the changing color.

Example 3

Figure 10:
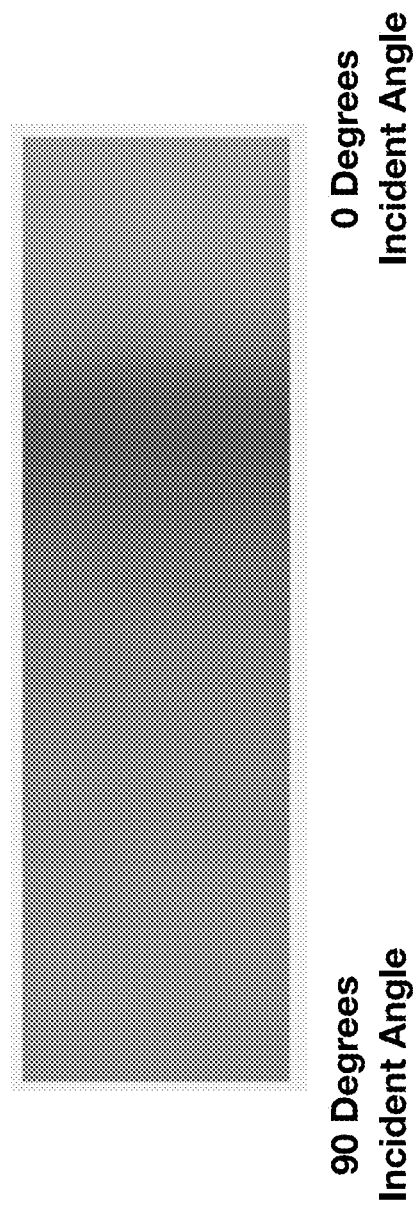
FIG. 10 depicts a model of the color shift of a 4-layer stack from 90 to 0 degrees of incident light, as provided by Example 3.
Figure 11:
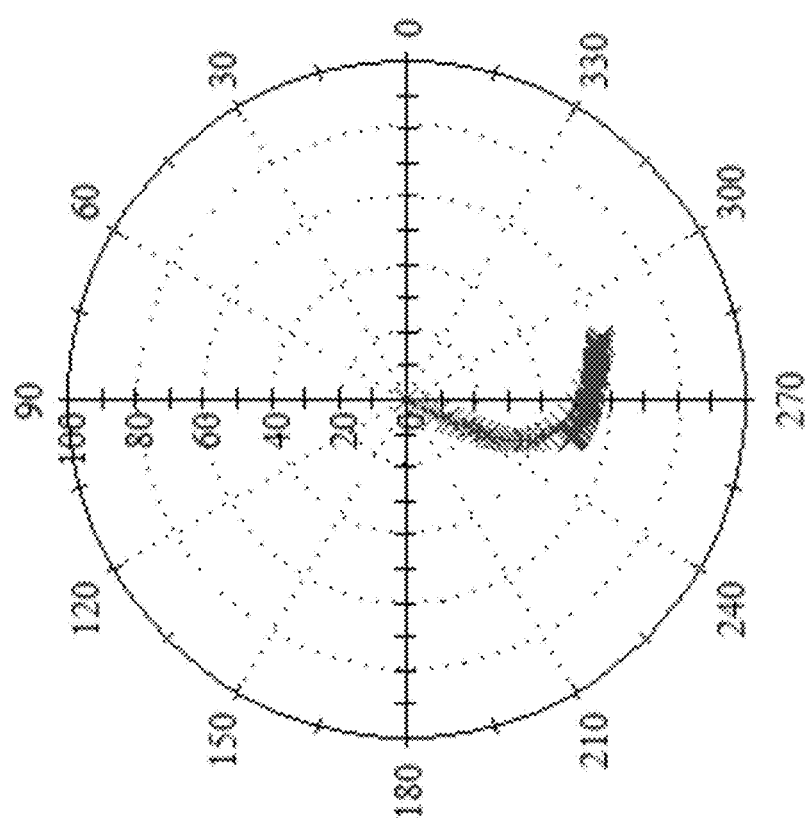
FIG. 11 depicts a plot of the related hue and chroma correlations at the different angles of observation, as provided by Example 3.
Figure 12:
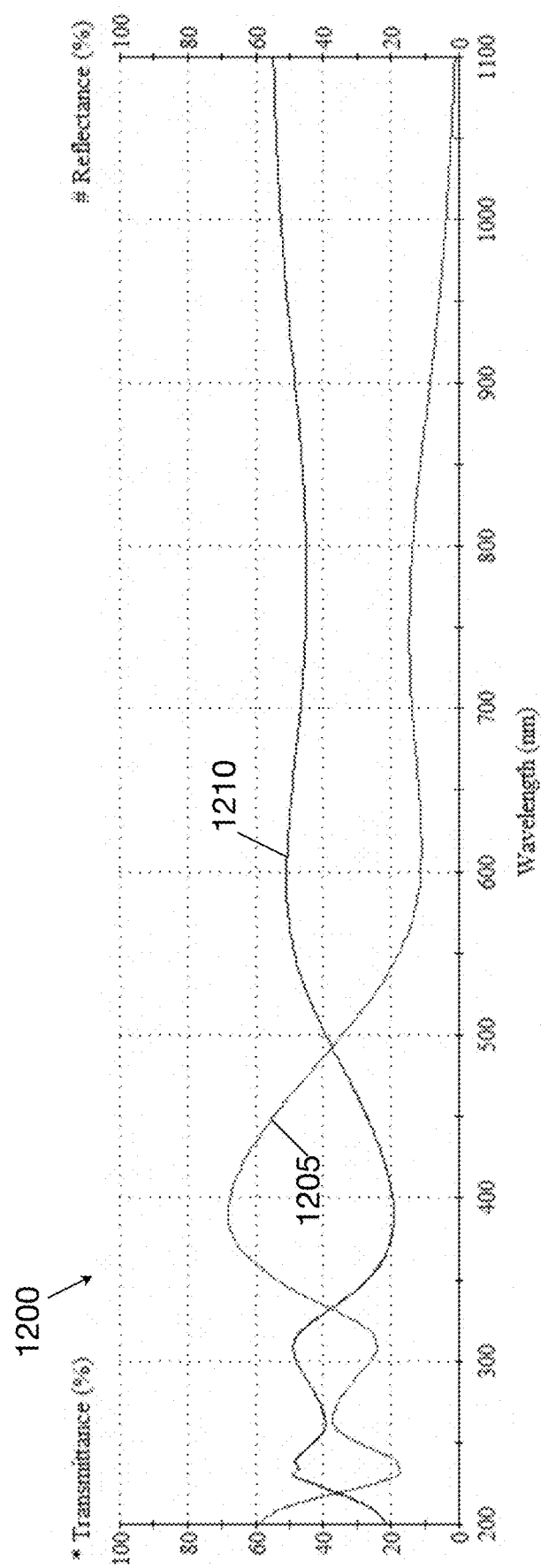
FIG. 12 depicts spectral data for the reflectance, back reflectance, and transmission of light through the multilayer film stack of Example 3.

This example serves as an iteration of the invention utilizing a transparent metal layer for a unidirectional color. The charts of FIGS. 10-12 are representative of a transparent film stack used to generate unidirectional color for window film applications. The film stack is as follows, with the order of layers beginning with the top most layer:
Titanium oxide (dielectric layer)—30 nm
Silicon oxide (dielectric layer)—85 nm
Titanium oxide (dielectric layer)—58 nm
Titanium metal (metal layer)—10 nm
PET film (base layer)—2 mil
This can be seen as almost identical to the film stack in Example 1, with the exception being the titanium base layer, which reduced to one tenth the thickness. FIG. 10 provides a simulation of the color at varying angles of incidence, FIG. 11 shows the hue and chroma correlate shifts at different angles of incidence, and FIG. 12 graphically depicts spectral data 1200 for the reflectance, back reflectance, and transmission of light through Example 3.

As can be seen in the color simulation, the color is a light purple that slowly grows in intensity to blue as the angle of incidence decreases. The is due to the transparent nature of the metallic film, and a reduction in the degree of constructive interference necessary for the color.

From the spectral data 1200 of FIG. 12, the color properties can also be inferred. Line 1205 correlates to the reflection off the coated side, and line 1210 correlates to the transmission of light through the film. While there is some slight shade of color in transmission due to the peak at about 400 nm, the color remains mostly neutral toned.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A multilayer film configured for application to a substrate, the multilayer film comprising:
   a base layer having a thickness from about 12 micrometers to about 2 millimeters;
   a metal layer having a thickness from about 5 nm to about 10 micrometers, the metal layer configured to reflect visible light; and
   a first dielectric layer having a thickness from about 5 nm to about 10 micrometers, wherein the base layer includes a first face and an opposing second face, wherein the first face is configured for application to the substrate and the second face directly contacts one of the metal layer or the first dielectric layer.

2. The multilayer film of claim 1, wherein the base layer includes an organic based substrate selected from a group consisting of: polyester, polyethylene terephthalate, polypropylene, polycarbonate, polyimide, polyamide, nylon, polyvinyl chloride, and combinations thereof.

3. The multilayer film of claim 1, wherein the metal layer is the product of physical or chemical deposition.

4. The multilayer film of claim 1, wherein the metal layer has an optical density from about 0.2 to about 3.0.

5. The multilayer film of claim 1, wherein the metal layer directly contacts the first dielectric layer and the metal layer is unoxidized.

6. The multilayer film of claim 1, wherein the metal layer includes a member selected from a group consisting of: aluminum, titanium, chrome, stainless steel, silver, gold, copper, molybdenum, and combinations thereof.

7. The multilayer film of claim 1, wherein the first dielectric layer has a refractive index from about 1.5 to about 4.

8. The multilayer film of claim 2, wherein the first dielectric layer includes a member selected from a group consisting of: titanium oxide, silicon oxide, aluminum oxide, titanium nitride, magnesium fluoride, zirconium oxide, hafnium oxide, and combinations thereof.

9. A multilayer film comprising:
a base layer having a thickness from about 12 micrometers to about 2 millimeters;
a metal layer having a thickness from about 5 nm to about 10 micrometers, the metal layer configured to reflect visible light, the metal layer directly contacting the base layer, and the metal layer having an optical density from about 0.2 to about 3.0;
a first dielectric layer having a thickness from about 5 nm to about 10 micrometers, the first dielectric layer directly contacting the metal layer, and the first dielectric layer having a refractive index from about 1.5 to about 4;
a second dielectric layer having a thickness from about 5 nm to about 10 micrometers, the second dielectric layer directly contacting the first dielectric layer, and the second dielectric layer having a refractive index from about 1.5 to about 4; and
a third dielectric layer having a thickness from about 5 nm to about 10 micrometers, the third dielectric layer directly contacting the second dielectric layer, and the third dielectric layer having a refractive index from about 1.5 to about 4.

10. A multilayer film comprising:
a base layer having a thickness from about 12 micrometers to about 2 millimeters;
a first dielectric layer having a thickness from about 5 nm to about 10 micrometers, the first dielectric layer directly contacting the base layer, and the first dielectric layer having a refractive index from about 1.5 to about 4;
a second dielectric layer having a thickness from about 5 nm to about 10 micrometers, the second dielectric layer directly contacting the first dielectric layer, and the second dielectric layer having a refractive index from about 1.5 to about 4;
a metal layer having a thickness from about 5 nm to about 10 micrometers, the metal layer configured to reflect visible light, the metal layer directly contacting the second dielectric layer, and the metal layer having an optical density from about 0.2 to about 3.0;
a third dielectric layer having a thickness from about 5 nm to about 10 micrometers, the third dielectric layer directly contacting the metal layer, and the third dielectric layer having a refractive index from about 1.5 to about 4; and
a fourth dielectric layer having a thickness from about 5 nm to about 10 micrometers, the fourth dielectric layer directly contacting the third dielectric layer, and the fourth dielectric layer having a refractive index from about 1.5 to about 4.

11. A multilayer film comprising:
a base layer having a thickness from about 12 micrometers to about 2 millimeters;
a metal layer having a thickness from about 5 nm to about 10 micrometers, the metal layer configured to reflect visible light;
a first dielectric layer having a thickness from about 5 nm to about 10 micrometers; and
a second dielectric layer, wherein the second dielectric layer is different from the first dielectric layer.

12. The multilayer film of claim 11, wherein the metal layer directly contacts the base layer.

13. A multilayer film comprising:
a base layer having a thickness from about 12 micrometers to about 2 millimeters;
a metal layer having a thickness from about 5 nm to about 10 micrometers, the metal layer configured to reflect visible light;
a first dielectric layer having a thickness from about 5 nm to about 10 micrometers; and
a second dielectric layer, wherein the first dielectric layer and the second dielectric layer are interposed by the metal layer.

14. A multilayer film comprising:
a base layer having a thickness from about 12 micrometers to about 2 millimeters;
a metal layer having a thickness from about 5 nm to about 10 micrometers, the metal layer configured to reflect visible light;
a first dielectric layer having a thickness from about 5 nm to about 10 micrometers;
a second dielectric layer; and
a third dielectric layer, wherein the first dielectric layer and the third dielectric layer are interposed by the second dielectric layer, wherein the first dielectric layer and the third dielectric layer are formed of the same composition, and wherein the first dielectric layer and the third dielectric layer have different thicknesses.

15. A multilayer film comprising:
a base layer having a thickness from about 12 micrometers to about 2 millimeters;
a metal layer having a thickness from about 5 nm to about 10 micrometers, the metal layer configured to reflect visible light, wherein the metal layer directly contacts the base layer;
a first dielectric layer having a thickness from about 5 nm to about 10 micrometers, wherein the first dielectric layer directly contacts the metal layer;
a second dielectric layer, wherein the second dielectric layer directly contacts the first dielectric layer; and
a third dielectric layer, wherein the third dielectric layer directly contacts the second dielectric layer.

16. A multilayer film comprising:
a base layer having a thickness from about 12 micrometers to about 2 millimeters;
a metal layer having a thickness from about 5 nm to about 10 micrometers, the metal layer configured to reflect visible light;
a first dielectric layer having a thickness from about 5 nm to about 10 micrometers;
a second dielectric layer;
a third dielectric layer; and
a fourth dielectric layer, wherein the first dielectric layer directly contacts the base layer, the second dielectric layer directly contacts the first dielectric layer, the metal layer directly contacts the second dielectric layer, the third dielectric layer directly contacts the metal layer, and the fourth dielectric layer directly contacts the third dielectric layer.

17. The multilayer film of claim 1, wherein the substrate is transparent glass.

* * * * *